United States Patent
Lee

(10) Patent No.: US 6,297,925 B1
(45) Date of Patent: Oct. 2, 2001

(54) METHOD FOR ELIMINATING WIGGLE OF MAGNETIC HEAD IN HARD DISK DRIVE

(75) Inventor: Jae-sung Lee, Seoul (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/261,391

(22) Filed: Mar. 3, 1999

(30) Foreign Application Priority Data

Mar. 4, 1998 (KR) .................................................. 98-7126

(51) Int. Cl.$^7$ .................................................. G11B 21/02
(52) U.S. Cl. .................................. 360/75; 360/53; 360/63
(58) Field of Search .................................. 360/53, 75, 46, 360/61, 62, 63, 31

(56) References Cited

U.S. PATENT DOCUMENTS

| | | | |
|---|---|---|---|
| 5,241,438 | 8/1993 | Matsushima | 360/105 |
| 5,600,217 | 2/1997 | Bartlett | 318/434 |
| 5,808,825 | 9/1998 | Okamura | 360/75 |
| 5,872,670 | 2/1999 | Ataee | 360/69 |
| 5,940,234 | * 8/1999 | Wilson et al. | 360/53 |
| 6,118,607 | * 9/2000 | Jung | 360/46 X |
| 6,172,836 | 1/2001 | Bang | 360/75 |
| 6,172,839 | 1/2001 | Ahn | 360/77.08 |
| 6,172,855 | 1/2001 | Kim | 360/256 |

* cited by examiner

Primary Examiner—Andrew L. Sniezek
(74) Attorney, Agent, or Firm—Robert E. Bushnell, Esq.

(57) ABSTRACT

A method for eliminating a wiggle of a magnetic head in a hard disk drive includes the steps of moving a first magnetic head to a parking area when wiggle is generated in the first magnetic head being in use, checking whether the first magnetic head is positioned in the parking area, using a second magnetic head at which the wiggle is not generated, and eliminating the wiggle by supplying current to the first magnetic head. The eliminating step further includes the step of supplying current to allow the first magnetic head to move to the parking area.

25 Claims, 2 Drawing Sheets

METHOD FOR ELIMINATING WIGGLE OF MAGNETIC HEAD IN HARD DISK DRIVE

CLAIM OF PRIORITY

This application makes reference to, incorporates the same herein, and claims all benefits accruing under 35 U.S.C. § 119 from an application for METHOD FOR ELIMINATING WIGGLE OF MAGNETIC HEAD IN HARD DISK DRIVE earlier filed in the Korean Industrial Property Office on the 4$^{th}$ day of March 1998 and there duly assigned Ser. No. 7126/1998, a copy of which application is annexed hereto.

FIELD OF THE INVENTION

The present invention relates to a method for eliminating a wiggle of a magnetic head in a hard disk drive.

DESCRIPTION OF THE RELATED ART

A hard disk drive writes data on a hard disk through a magnetic head and reads the written data After the data is written, the head core and the circumference thereof in the magnetic head may be often in a charged state, i.e., electrically non-neutral state, which is called a wiggle. This phenomenon is referred to as a pinning of a particle component domain in the magnetic head. If such a charging phenomenon occurs in the magnetic head, a noise is generated during the data read by the magnetic head, which is called a wiggle noise.

To prevent the generation of the wiggle noise, it is necessary to eliminate the wiggle by supplying current to the magnetic head where the charging phenomenon has occurred, which is a bimodal retry or a remote write operation. If the remote write operation is performed, the pinned domain is recovered to a normal state and thus the wiggle is prevented from being generated. In eliminating the wiggle, the remote write operation must be performed when the magnetic head is positioned in a parking area. Otherwise, the remote write operation destroys the data or servo information which is written on the disk positioned below the magnetic head.

U.S. Pat. No 5,600,217 for a CMOS Disk Drive Motor Control Circuit Having Back-EMF Regulator Circuitry to Bartlett discloses parking the head of a disk drive to prevent back-EMF from the disk drive motor from exceeding a predetermined level. However, I have not seen a reference which parks a magnetic head when the magnetic head is in a charged state or wiggle. Nor have I seen a device which uses the second magnetic head to determine the position of the first magnetic head when it is desirable for the first magnetic head to be located in the parking area.

SUMMARY OF THE INVENTION

To solve the above problems, it is an object of the present invention to provide a method for eliminating wiggle, by which a remote write operation is performed in a state where a magnetic head is definitely positioned in a parking area.

To accomplish the above object of the present invention, there is provided a method for eliminating a wiggle of a magnetic head in a hard disk drive by moving a first magnetic head to a parking area when wiggle is generated in the first magnetic head being in use; checking whether the first magnetic head is positioned in the parking area, using a second magnetic head at which the wiggle is not generated; and eliminating the wiggle by supplying current to the first magnetic head.

Preferably, the eliminating step further comprises the step of supplying current to allow the first magnetic head to move to the parking area.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar components, wherein.

DESCRIPTION OF THE PREFERRED EMBODIMENT(S)

Figure 1:
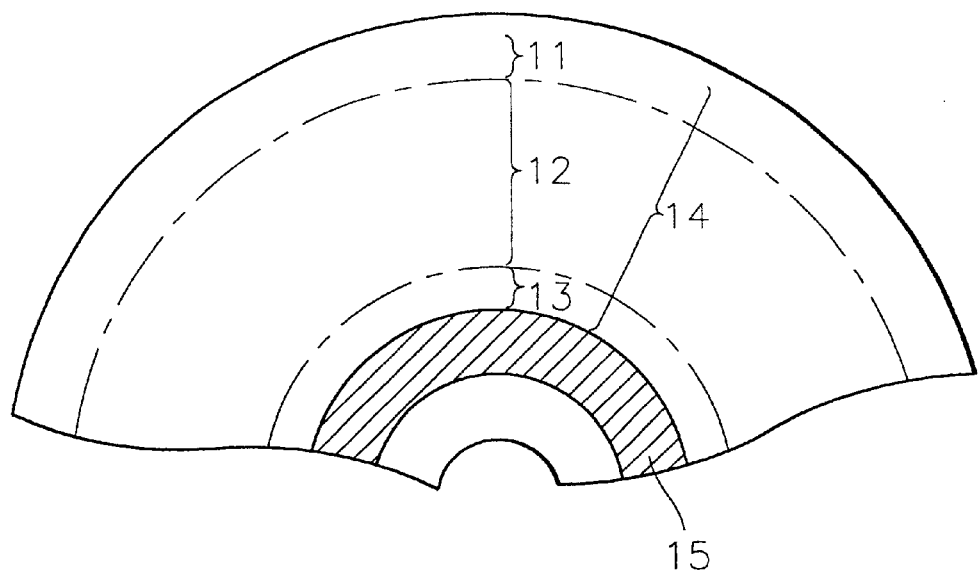
FIG. 1 is a plan view showing the arrangement of various fields on a general hard disk.

FIG. 1 shows the arrangement of various fields on a general hard disk.

Referring to FIG. 1, a parking area 15, an inner guard band (IGB) 13, a data area 12 and an outer guard band (OGB) 11 are sequentially arranged from the innermost part to the outer part of the hard disk. Here, user's data information is written on the data area 12.

Also, a maintenance area (not shown) used in manufacturing a hard disk may be allocated in the outer part of the disk. The servo information is written on the IGB 13, data area 12 and OGB 11 but is not written on the parking area 15 or maintenance area. Here, the area of the disk where the servo information is written is called the servo area 14. However, hereinbelow, the parking area and the maintenance area on which the servo information is not written are collectively called the parking area. The servo information is concerned with a phase locked loop (PLL), a servo address mark, a gray code or a servo burst. The servo burst is information for generating a position error signal (PES).

In a hard disk having such a field structure, if the wiggle is eliminated in a state where the magnetic head is not positioned in the parking area 15, the data or servo information written on the hard disk may be destroyed. However, according to the earlier method for eliminating the wiggle, the remote write operation is performed in a state where it is not confirmed that the magnetic head is definitely positioned in the parking area 15. Accordingly, the written data or servo information is often destroyed.

Figure 2:
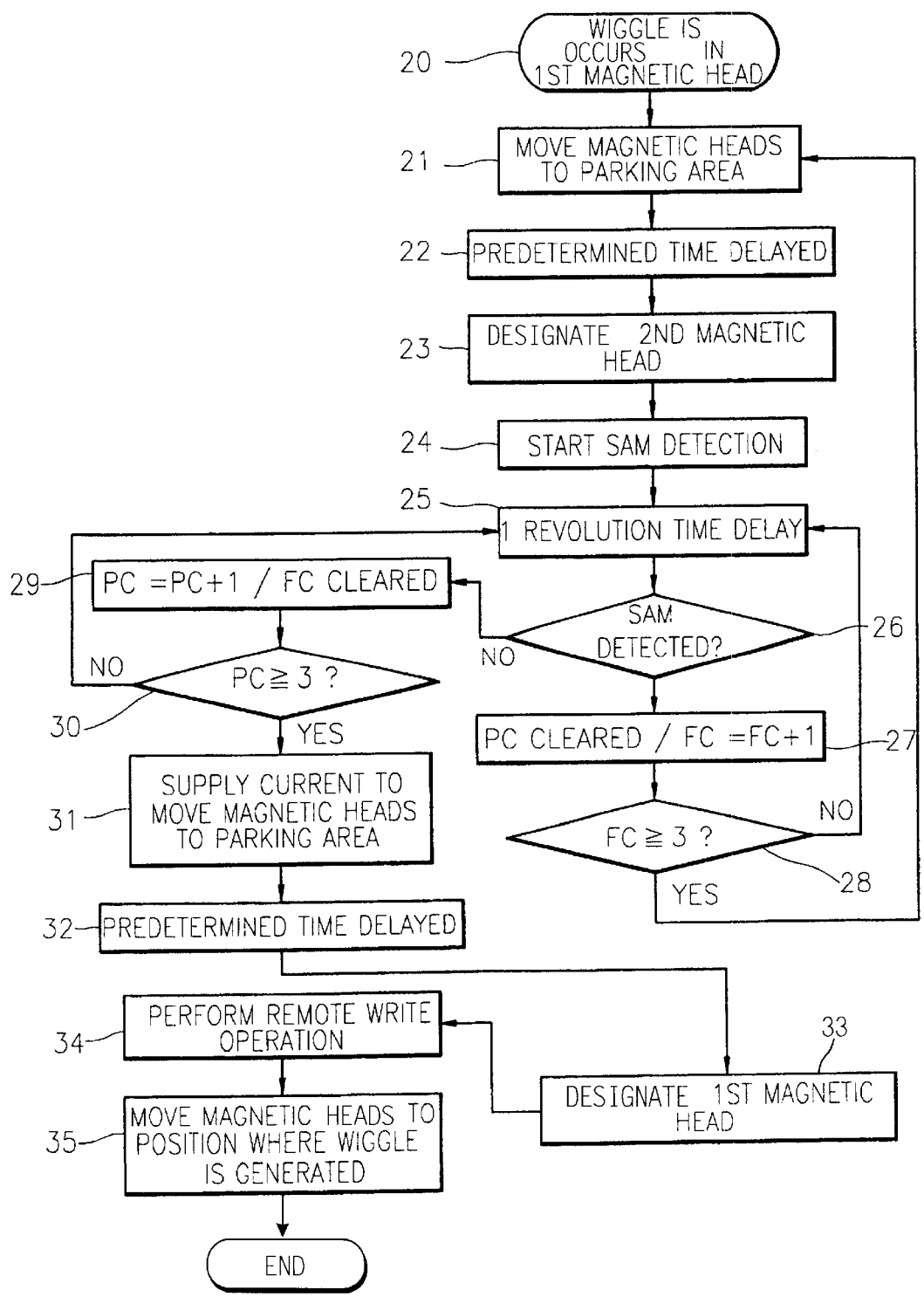
FIG. 2 is a flow chart showing a method for eliminating a wiggle of a magnetic head in a hard disk according to the present invention.

A method for eliminating a wiggle of a magnetic head in a hard disk drive according to the present invention includes the steps of moving a first magnetic head, checking a moved position and eliminating the wiggle of the first magnetic head. In other words, if the wiggle is generated in a first magnetic head while a first magnetic head is in use, then the first magnetic head is moved to the parking area in the moving step. In the checking steps, a second magnetic head in which no wiggle is generated is checked to determine whether the first magnetic head is positioned in the parking area. In the eliminating step, current is supplied to the first magnetic head for eliminating the generated wiggle. These steps will now be described in more detail with reference to FIG. 2.

If the wiggle is generated in the first magnetic head (step 20), time is delayed by a predetermined amount so that the first magnetic head is definitely positioned in the parking area (step 22). Generally, since all magnetic heads are integrally connected with one another, the movement of a specific magnetic head causes other magnetic heads to move together.

Next, a second magnetic head in which no wiggle is generated is designated (step 23), so that detection of a servo address mark (SAM) is started using the second magnetic head (step 24). Here, the SAM is an area written by data for generating a servo signal. In detecting the SAM, the second magnetic head, instead of the first magnetic head, is used, so that the generation of the wiggle noise is prevented. Also, SAM detection is performed in order to check whether the first magnetic head is definitely seated in the parking area. In other words, since the SAM does not exist in the parking area of the disk, no SAM detection confirms that the first magnetic head is positioned in the parking area. Therefore, if the second magnetic head detects the SAM, it is determined that the magnetic head has not reached the parking area yet. Since it is checked whether the SAM is detected or not through one track of a hard disk, the hard disk is revolved once (step 25). Thereafter, it is determined whether the SAM is detected or not by the second magnetic head (step 26). Here, if the SAM is not detected by the second magnetic head, it is determined that the first magnetic head has reached the parking area. Thus, a step of eliminating the wiggle of the first magnetic head may be directly performed without subsequent steps.

In order to confirm that the first magnetic head is positioned in the parking area, the following confirming procedure is preferably performed. In other words, if the SAM is detected, a pass counter (PC) is cleared and the value of a failure counter (FC) is increased by 1 (step 27). Then, it is determined whether the value of the FC is greater than or equal to 3, that is, whether the SAM is detected three times or more (step 28). If the value of the FC is greater than or equal to 3, the procedure returns to the step 21 to perform the steps again from the step of moving the magnetic heads to the parking area. If the SAM is not detected (step 26), the PC is cleared and the value of the PC is increased by 1 (step 29). If the value of the PC is greater than or equal to 3 (step 30), it is determined that the magnetic heads are definitely positioned in the parking area and then the eliminating step is performed.

Before eliminating the wiggle of the first magnetic head, current is supplied to definitely move the magnetic heads to the parking area of the disk (step 31). By doing so, even if the magnetic head is subjected to an impact, it is guaranteed that the magnetic head will not move from the parking area. Also, the magnetic head is again moved to the parking area, even if the SAM is not detected in error in the checking step. Then time is delayed by a predetermined amount until the magnetic heads are definitely positioned in the parking area 15 (step 32). The first magnetic head in which the wiggle is generated is designated (step 33), and a write current is supplied to the first magnetic head to perform a remote write operation, thereby eliminating the wiggle (step 34). Thereafter, the magnetic head is moved to the disk position where the first magnetic head has intended to read (step 35) to continuously perform perform intermittent reading procedures.

As described above, according to the method for eliminating the wiggle of the magnetic head, a remote write operation is performed in a state where a magnetic head is definitely positioned in a parking area, thereby preventing the data or servo information written on the disk from being destroyed.

The present invention is not limited to the above-described embodiment and modifications and changes may be effected by one skilled in the art.

What is claimed is:

1. In a hard disk drive having a first and second magnetic heads coupled to move in tandem, a method for eliminating a wiggle of said first magnetic head, comprising the steps of:
   moving said first magnetic head to a parking area from a servo area when wiggle is generated in the first magnetic head being in use;
   checking whether the first magnetic head is positioned in the parking area by the status of said second magnetic head at which the wiggle is not generated;
   eliminating the wiggle by supplying current to the first magnetic head;
   determining if said wiggle has been removed from said first magnetic head; and
   repeating the positioning step and the supplying current step if said wiggle has not been removed from said first magnetic head.

2. The method according to claim 1, wherein the eliminating step further comprises the step of supplying current to allow the first magnetic head to move to the parking area.

3. The method according to claim 1, wherein the checking step comprises the steps of:
   (a) checking whether the second magnetic head is positioned in a servo area; and
   (b) repeatedly performing the moving step if the second magnetic head is positioned in the servo area.

4. The method according to claim 3, wherein the step (a) is performed within a predetermined time.

5. In a hard disk drive having a first and a second magnetic heads that are integrally connected and move together, a method of eliminating a charged state in said first magnetic head by examining electrical characteristics of said second magnetic head, said method comprising the steps of:
   providing said first magnetic head initially in a charged state, and said second magnetic head not in a charged state;
   moving said first magnetic head from a servo area to a parking area when said first magnetic head is in a charged state;
   checking whether said first magnetic head is in said parking area by examining the location of said second magnetic head;
   performing a remote write operation on said first magnetic head located in said parking area;
   moving said first magnetic head and said second magnetic head back to the servo area of said hard disk;
   determining if said first magnetic head is still in a charged state; and
   repeating the moving, checking and performing a remote write operation steps if said first magnetic head is still in a charged state.

6. The method of claim 5, wherein said step of checking whether said first magnetic head is in said parking area by examining the location of said second magnetic head further comprises the steps of:
   setting a pass counter and a fail counter to zero;
   detecting whether said second magnetic head is in said servo area of said hard disk drive;
   incrementing said fail counter if said second magnetic head is in said servo area and incrementing said pass counter if said second magnetic head is in said parking area;
   rotating said hard disk one revolution; and
   repeating said detecting and said incrementing step until either said pass counter equals three or said fail counter equals three.

7. The method of claim 6, wherein said step of detecting whether said second magnetic head is in said servo area of said hard disk drive is comprised of:

detecting the servo address mark (SAM) of said second magnetic head, said detection of said servo address mark indicates that both said first magnetic head and said second magnetic head are not in said parking area.

8. The method of claim 6, wherein said fail counter is set to zero whenever said pass counter is incremented and said pass counter is set to zero whenever said fail counter is incremented.

9. In a hard disk drive comprising a first and a second magnetic head that move together, a method for removing wiggle from said first magnetic head comprising the steps of:

providing said second magnetic head is absent a wiggle;
   attempting to move both said first and said second magnetic heads to a parking area of a hard disk;
   measuring the electrical characteristics of said second magnetic head to determine if said first magnetic head is in said parking area;
   applying a write current to said first magnetic head to remove said wiggle if it is determined that said first magnetic head is positioned in said parking area of said hard disk;
   determining whether said wiggle has been removed from said first magnetic head; and
   repeating the moving, measuring, and applying a write current steps if it is determined that said wiggle is still not removed from said first magnetic head.

10. The method of claim 9, said step of measuring the electrical characteristics of said second magnetic head comprises the steps of:

setting a pass counter and a fail counter to zero;
   determining if said second magnetic head detects a servo address mark (SAM);
   incrementing said fail counter if said SAM is detected by said second magnetic head;
   setting said pass counter to zero if said SAM is detected by said second magnetic head;
   incrementing said pass counter if said second magnetic counter does not detect a SAM;
   setting said fail counter to zero if said second magnetic head does not detect a SAM;
   revolving said hard disk one revolution;
   repeating said determining if said second magnetic head detects a SAM, and said incrementing and setting of counters until either said fail counter equals three or said pass counter equals three;
   returning to said step of attempting to move said first and said second magnetic heads if said fail counter equals three; and
   moving to said applying a write current step if said pass counter equals three.

11. A hard disk drive, comprising:

a first magnetic bead;
   a second magnetic head that is absent a wiggle, said second magnetic head moves in tandem with said first magnetic head to various locations on a hard disk;
   a hard disk having a servo area and a parking area;
   means for coincidently moving both said first magnetic head and said second magnetic head from said servo area of said hard disk to said when said first magnetic head contains wiggle; and
   a pass counter and a fail counter to determine whether said first magnetic head is located in said parking zone of said hard disks.

12. The hard disk drive of claim 11, further comprising a means for supplying electrical current to said first magnetic head and said second magnetic head to move said first and said second magnetic heads to said parking area of said hard disk drive.

13. The hard disk drive of claim 11, further comprising a means for supplying electrical current to said first magnetic head when located in said parking area to eliminate said wiggle from said first magnetic head.

14. The hard disk drive of claim 13, wherein said electrical current is applied to said first magnetic head when said pass counter reaches a value greater than one.

15. The hard disk drive of claim 14, wherein said pass counter is incremented when said second magnetic head does not detect a servo address mark and said pass counter is set to zero when said second magnetic head detects a servo mark address.

16. The hard disk drive of claim 14, wherein said fail counter is incremented when said second magnetic head detects a servo address mark and said fail counter is set to zero when said second magnetic head does not detect a servo mark address.

17. A method of operating a hard disk drive having a plurality of magnetic heads, comprising:

moving a first magnetic head coupled to move in tandem with a second magnetic head, from a servo area to a parking zone when said first magnet head generates wiggle during use;
   attempting to move both said first and said second magnetic heads to a parking area of said hard disk;
   measuring electrical characteristics of said second magnetic head to determine whether said first magnetic head is within said parking area;
   applying a write current to said first magnetic head to remove said wiggle when said first magnetic head is determined to be within said parking area;
   making a determination of whether said wiggle has been removed from said first magnetic head; and
   repeating said steps of attempting to move said first magnetic head to said parking area, measuring said electrical characteristics of said second magnetic head and applying a write current to said first magnetic head when said determination establishes that said wiggle has not been removed from said first magnetic head.

18. The method of claim 17, wherein said measuring said electrical characteristics of said second magnetic head comprise detecting the presence or absence of a servo address mark.

19. The method of claim 18, wherein a pass counter counts the number of times the second magnetic head does not detect the servo address mark and a fail counter counts the number of times the second magnetic head detects the presence of the servo address mark.

20. The method of claim 19, wherein said first magnetic head is determined to be within said parking area when said pass counter reaches a predetermined value greater than one.

21. An apparatus providing correction of wiggle by one of a plurality of magnetic heads, said apparatus comprising:

a hard disk drive;
   a first magnetic head selected from among said plurality of magnetic heads;
   a second magnetic head selected from among said plurality of magnetic heads, said second magnetic head being integrally coupled to move in tandem with said first magnetic head;

a rotatable memory disk exhibiting a plurality of sets of concentric circular zones each associated with a different one of said plurality of magnetic heads and each comprised of a parking area, and a servo area;

a failure counter maintaining a count of a number of times that a servo address mark is detected within a corresponding said servo area by said second magnetic head while said second magnetic head exhibits no wiggle after said hard disk drive has begun to move said first magnetic head to said parking zone when wiggle is occurring in said first magnetic head; and a pass counter maintaining a count of a number of times that said servo address mark is not detected by said second magnetic head while said second magnetic head exhibits no wiggle after said hard disk drive has begun to move said first magnetic head to said parking zone.

22. The apparatus of claim 21, further comprised of said hard disk drive applying a write current to said first magnetic head after said pass counter indicates that said first magnetic head is within said parking zone.

23. The apparatus of claim 22, wherein said servo area of said disk comprises in radial sequence an inner guard band, a user's area upon which data may be written by a corresponding said one of said plurality of magnetic heads, and an outer guard band.

24. The apparatus of claim 22, wherein said failure counter is reset to zero when said pass counter is incremented and said pass counter is reset to zero when said failure counter is incremented.

25. The apparatus of claim 24, wherein said pass counter indicates that said first magnetic head is within said parking zone when said pass counter reaches a value greater than one.

* * * * *